US012614337B2

(12) United States Patent
Maschmeyer et al.

(10) Patent No.: US 12,614,337 B2
(45) Date of Patent: Apr. 28, 2026

(54) SYSTEM AND METHODS FOR CUSTOMIZING 3D MODELS

(71) Applicant: Shopify Inc., Ottawa (CA)

(72) Inventors: Russ Maschmeyer, Berkeley, CA (US); Eric Andrew Florenzano, San Francisco (CA); Brennan Letkeman, Calgary (CA); Diego Macario Bello, Montreal (CA); Daniel Beauchamp, Toronto (CA)

(73) Assignee: Shopify Inc., Ottawa (CA)

( * ) Notice: Subject to any disclaimer, the term of this patent is extended or adjusted under 35 U.S.C. 154(b) by 195 days.

(21) Appl. No.: 18/490,458

(22) Filed: Oct. 19, 2023

(65) Prior Publication Data

US 2025/0069318 A1     Feb. 27, 2025

Related U.S. Application Data

(60) Provisional application No. 63/578,211, filed on Aug. 23, 2023.

(51) Int. Cl.
| | |
|---|---|
| *G06T 15/04* | (2011.01) |
| *G06T 7/11* | (2017.01) |
| *G06T 19/20* | (2011.01) |

(52) U.S. Cl.
CPC ................ *G06T 15/04* (2013.01); *G06T 7/11* (2017.01); *G06T 19/20* (2013.01); *G06T 2200/24* (2013.01); *G06T 2219/2021* (2013.01)

(58) Field of Classification Search
CPC . G06T 15/04; G06T 7/11; G06T 19/20; G06T 2200/24; G06T 2219/2021
See application file for complete search history.

(56) References Cited

U.S. PATENT DOCUMENTS

2023/0343017 A1* 10/2023 Yang .......................... G06T 7/11

FOREIGN PATENT DOCUMENTS

| CN | 108062758 B | * | 6/2019 | ............. G06T 7/136 |
|---|---|---|---|---|
| CN | 116310213 A | * | 6/2023 | ............. G06T 17/20 |

OTHER PUBLICATIONS

Kirillov, Alexander, et al. ("Segment anything." Proceedings of the IEEE/CVF international conference on computer vision. Apr. 5, 2023). (Year: 2023).*

* cited by examiner

*Primary Examiner* — Xin Sheng
(74) *Attorney, Agent, or Firm* — Rowand LLP

(57) ABSTRACT

A computer-implemented method is disclosed. The method includes: receiving an indication of a first point on a three-dimensional (3D) model; determining a second point in a texture map of the 3D model that corresponds to the first point; performing segmentation of the texture map for identifying portions of the texture map that are related to the second point; and outputting a 3D representation of the identified related portions of the texture map.

18 Claims, 10 Drawing Sheets

300

Receive an indication of a first point on a 3D model 302

Determine a second point in a texture map of the 3D model that corresponds to the first point 304

Perform a segmentation of the texture map for identifying portions of the texture map that are related to the second point 306

Output a 3D representation of the identified related portions of the texture map 308

500

Receive user input indicating selection of a portion of a 3D model of a product and a user action 502

Determine an output type of the requested user action 504

Process requested user action in connection with the 3D model 506

Provide, via user interface, a representation of the result of the user action 508

600

615'

600

615"

SYSTEM AND METHODS FOR CUSTOMIZING 3D MODELS

CROSS-REFERENCE TO RELATED APPLICATION

The present application claims the benefit of priority to U.S. Provisional Patent Application No. 63/578,211 filed on Aug. 23, 2023, the contents of which are incorporated herein by reference.

TECHNICAL FIELD

The present disclosure relates to three-dimensional (3D) computer graphics and, in particular, to a system and methods for customizing 3D models.

BACKGROUND 3D modeling of objects provides a useful mechanism for representing object surfaces in three dimensions. A 3D model represents a physical body using a collection of points in 3D space, connected by lines, curved surfaces, triangles, and other geometric elements. With 3D modeling, it is possible to create detailed digital representations of physical objects, enabling a wide range of visualization, simulation, and analysis applications.

BRIEF DESCRIPTION OF THE DRAWINGS

Embodiments will be described, by way of example only, with reference to the accompanying figures wherein.

Like reference numerals are used in the drawings to denote like elements and features.

DETAILED DESCRIPTION OF EMBODIMENTS

Figure 1:
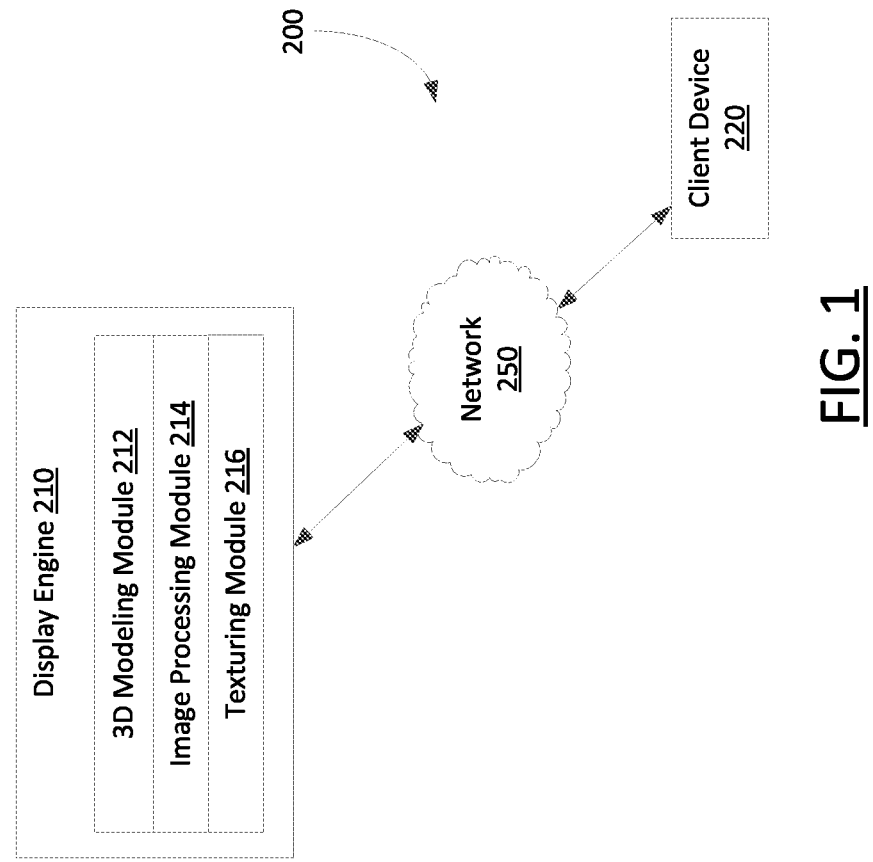
FIG. 1 illustrates an example networked computing environment for creating and customizing 3D models.

In an aspect, the present disclosure describes a computer-implemented method. The method includes: receiving an indication of a first point on a three-dimensional (3D) model; determining a second point in a texture map of the 3D model that corresponds to the first point; performing segmentation of the texture map for identifying portions of the texture map that are related to the second point; and outputting a 3D representation of the identified related portions of the texture map.

In some implementations, receiving selection of the first point may include receiving, via an input device, user input for selecting a point on a render of the 3D model.

In some implementations, the texture map may comprise a 2D image representing a projection of the 3D model's surfaces in texture space.

In some implementations, the second point in the texture map may be determined based on a mapping of 3D coordinates of the first point to texture space.

In some implementations, performing the segmentation may include running a segmentation algorithm on the texture map.

In some implementations, the segmentation algorithm may take an indication of the second point as input.

In some implementations, the method may further include performing a pre-processing segmentation on a render of the 3D model for identifying a minimum cover portion of the 3D model corresponding to the selected first point, and the segmentation of the texture map may be performed only on the minimum cover portion.

In some implementations, the 3D representation of the identified related portions of the texture map may include a 3D version of an image mask.

In another aspect, the present application discloses a computing system. The computing system includes a processor and a memory storing computer-executable instructions that, when executed, are to cause the processor to: receive an indication of a first point on a three-dimensional (3D) model; determine a second point in a texture map of the 3D model that corresponds to the first point; perform segmentation of the texture map for identifying portions of the texture map that are related to the second point; and output a 3D representation of the identified related portions of the texture map.

In another aspect, the present application discloses a non-transitory, computer-readable medium storing computer-executable instructions that, when executed by a processor, are to cause the processor to: receive an indication of a first point on a three-dimensional (3D) model; determine a second point in a texture map of the 3D model that corresponds to the first point; perform segmentation of the texture map for identifying portions of the texture map that are related to the second point; and output a 3D representation of the identified related portions of the texture map.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "product data" refers generally to data associated with products that are offered for sale on an e-commerce platform. The product data for a product may include, without limitation, product specification, product category, manufacturer information, pricing details, stock availability, inventory location(s), expected delivery time, shipping rates, and tax and tariff information. While some product data may include static information (e.g., manufacturer name, product dimensions, etc.), other product data may be modified by a merchant on the e-commerce platform. For example, the offer price of a product may be varied by the merchant at any time. In particular, the merchant may set the product's offer price to a specific value and update said offer price as desired. Once an order is placed for the product at a certain price by a customer, the merchant commits to pricing; that is, the product price may not be changed for the placed order. Product data that a merchant may control (e.g., change, update, etc.) will be referred to as variable product data. More specifically, variable product data refers to product data that may be changed automatically or at the discretion of the merchant offering the product.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and any associated payment requests, via an e-commerce platform, and the e-commerce platform may be equipped with transaction/payment processing components or delegate such processing activities to one or more third-party services. An e-commerce platform may be extended by connecting one or more additional sales channels representing platforms where products can be sold. In particular, the sales channels may themselves be e-commerce platforms, such as Facebook Shops™, Amazon™, etc.

Techniques for Customizing 3D Models 3D modeling software enables users to create, select, edit, or otherwise manipulate 3D models of objects. Modern software for 3D modeling has various limitations. As a specific example, selecting or changing textures for a 3D model may involve manual steps that are difficult or tedious to perform using modeling software. In some instances, when a 3D object is rendered in software, only the currently visible portions may be selectable by the user. Any texture that is not visible in the current 3D view may not be selected or changed by the user. As a result, the user may be required to manipulate (e.g., rotate, move, resize, etc.) the 3D object rendered by the software in order to select a desired point on the object or to apply texture to different surfaces of the object.

Further, even when all of the portions for selection are visible in a current view of the 3D model, the user's ability to simultaneously select multiple points or apply a common texture to multiple different portions (or regions) along the object surfaces, occluded or otherwise, may be limited. In particular, the user may need to manually select each portion individually and then apply a desired texture to the selections. This can be time-consuming, particularly if the user wishes to apply textures to a large number of different portions, and can lead to errors and deficiencies in texturing due to the reliance on manual selection by the user.

A novel approach to augmenting a 3D model with texture data is proposed. When a user selects a point on a rendering of a 3D model, the selected point is mapped to a point in texture space. Specifically, the 3D coordinates of the selected point on the 3D model are mapped to 2D coordinates in texture space. After the 3D point is mapped to the texture space, a segmentation algorithm (e.g., "Segment Anything Model", or SAM) may be run on the corresponding texture map in texture space, with the selected point included as part of an input to the algorithm.

The segmentation algorithm may, in some implementations, be a semantic segmentation algorithm. Semantic segmentation is a type of segmentation that treats multiple objects/points of the same type or class as a single entity. Each pixel in an input image (e.g., texture map) is assigned to a specific class or object. The segmentation algorithm may take, as input, an indication of a point in a texture map corresponding to the selected point on the 3D model. The indication may, for example, include 2D coordinates of the point in the texture map. The segmentation algorithm may identify all or multiple points/portions of the object that are of the same class (e.g., belonging to a same surface sections)-even if not visible in the current rendered view of the 3D model-without the user having to manipulate the 3D model.

The output of the segmentation algorithm may be further processed to support various user interactions with the 3D model. For example, a mask corresponding to the selected points/regions may be generated, and the entire mask may be translated back into 3D space to be displayed to the user. This process may also enable users to select and replace various aspects of a 3D model of an object. In some implementations, a merchant (or a customer) may be able to customize the texture of a 3D model of a product that is offered by the merchant on an e-commerce platform. For example, a point on the 3D model can be selected, and texture data for portions of the 3D model that are related to this selected point may be modified.

In some implementations, the 3D model may undergo pre-processing prior to segmentation analysis of the corresponding 2D data. A segmentation algorithm may first be run on a 2D image of the render of the 3D model to segment the image. In this way, a "minimum cover" corresponding to a user-selected point on the 3D model may be identified. The segmentation algorithm may be run a second time on the minimum cover in the texture space in order to identify points/regions of the object surfaces that are of the same class/label, e.g., belonging to same surface sections, as the selected point. This segmentation process may involve iterating over multiple points and ending once the full minimum cover is accounted for in the texture space.

Additionally, in some implementations, the pre-processing of a 3D model may enable identification of different texture materials associated with the model and presenting such information to a user. For example, if multiple texture materials are detected based on a 3D scan of an object, the object's texture can be displayed to the user (for example, in modeling software) so as to graphically represent the distinction between parts of the texture corresponding to the different materials. The graphical representation may facilitate user selection of and changes to identifiable portions of an object's texture.

Reference is first made to FIG. 1, which illustrates, in block diagram form, an example networked computing environment 200 for creating and customizing 3D models of objects. As shown in FIG. 1, the networked computing environment 200 may include a display engine 210, client devices 220, and a network 250 connecting the components of the computing environment 200.

The client device 220 is a computing device. The client device 220 may, for example, be a mobile communication device such as a smartphone, a tablet computer, a wearable computer (such as an HMD or smartwatch), a laptop or desktop computer, or a computing device of another type.

The client device 220 is communicably connected to the display engine 210 via the network 250.

The client device 220 may be associated with a customer on an e-commerce platform. For example, the client device 220 may be used by a customer to, for example, access product information, order products, manage customer accounts, and otherwise facilitate various actions of the customer on the e-commerce platform. Using the client device 220, a customer can view, edit, manipulate, and otherwise interact with 3D models of objects. In particular, a customer may access, using their client device 220, 3D model data for products that are offered for sale on an e-commerce platform.

Additionally, or alternatively, the client device 220 may be associated with a merchant offering products (i.e., goods, services, etc.) on an e-commerce platform. Using the client device 220, a merchant may generate and upload product information, manage online storefronts, and access various merchant-facing functionalities of an e-commerce platform. In particular, a merchant may create, upload, and modify 3D model data associated with one or more of their products on an e-commerce platform.

A display engine 210 is provided in the networked computing environment 200. The display engine 210 contains processor-executable instructions that, when executed by one or more processors, cause a computing system to carry out some of the processes and functions described herein. In some implementations, the display engine 210 may be provided by an e-commerce platform, either as a core function of the platform or as an application or service supported by or communicating with the platform. In other implementations, the display engine 210 may be implemented, at least in part, on a user device, such as the client device 220, or as a stand-alone service that enables users to create, customize, or otherwise interact with 3D models of objects.

The display engine 210 supports displaying graphical representations of real-world objects. In some implementations, the display engine 210 may be configured to display 3D models of products that are offered for sale on an e-commerce platform. The 3D models may enable visualization of product features. As shown in FIG. 1, the display engine 210 may include a 3D modeling module 212, an image processing module 214, and a texturing module 216. The modules may comprise software components that are stored in a memory and executed by one or more processors to support various functions of the display engine 210.

The 3D modeling module 212 is configured to perform operations for constructing, editing, storing, manipulating, and rendering 3D models of objects. A 3D model is a mathematical representation of a subject, such as a person, a physical object, or a real-world space. The 3D modeling module 212 may obtain information (e.g., image and video data, range/depth data, etc.) about an object and generate a virtual 3D representation of the object based on the obtained information. 3D models may be generated using various techniques such as 3D scanning (e.g., laser scanning, photogrammetry, etc.), digital sculpting, and polygonal modeling.

The image processing module 214 is configured to analyze images stored and/or received by the display engine 210. The image processing module 214 may receive image data (e.g., images, videos, live media feeds, etc.) as input, and output various information regarding the received images. Any of a number of different algorithms may be included in or implemented by the image processing module 214. Non-limiting examples of such algorithms include:

image segmentation algorithms; object recognition algorithms; surface, corner, and/or edge detection algorithms; and motion detection algorithms. In some implementations, the image processing module 214 may process images to detect objects and to identify features of the detected objects in the images. Examples of such object features include corners, surfaces, edges, and/or dimensions of objects.

The texturing module 216 is configured to determine texture data for 3D models. Texture, such as high frequency detail, surface texture, or color, may be applied to surfaces of a 3D model. In at least some implementations, the texturing module 216 performs operations for mapping a texture onto a 3D model. More particularly, the texturing module 216 may implement UV mapping, which is a process for projecting a 3D model's surface to a 2D image for texture mapping. UV mapping results in a correlation between a 2D image and how it appears as a texture when mapped onto a 3D surface mesh.

When a 3D model is created as a polygon mesh, the texturing module 216 assigns coordinates ("UV coordinates") of a two-dimensional texture coordinate system, or texture space, to each vertex of the mesh. The UV coordinates are then mapped to a 2D image, called a texture map. The texturing module 216 may employ various techniques for creating and editing UV maps, such as automatic unwrapping, seams, islands, pins, and projections. The texture appears on the surfaces when a 3D model is rendered according to the UV map.

The display engine 210 and the client devices 220 may be in geographically disparate locations. In particular, the client devices 220 may be located remotely from the display engine 210.

The network 250 is a computer network. In some implementations, the network 250 may be an internetwork such as may be formed of one or more interconnected computer networks. For example, the network 250 may be or may include an Ethernet network, an asynchronous transfer mode (ATM) network, a wireless network, or the like.

In some example embodiments, the display engine 210 may be integrated as a component of an e-commerce platform. That is, an e-commerce platform may be configured to implement example embodiments of the display engine 210. More particularly, the subject matter of the present application, including example methods for customizing 3D models disclosed herein, may be employed in the specific context of e-commerce.

Figure 2:
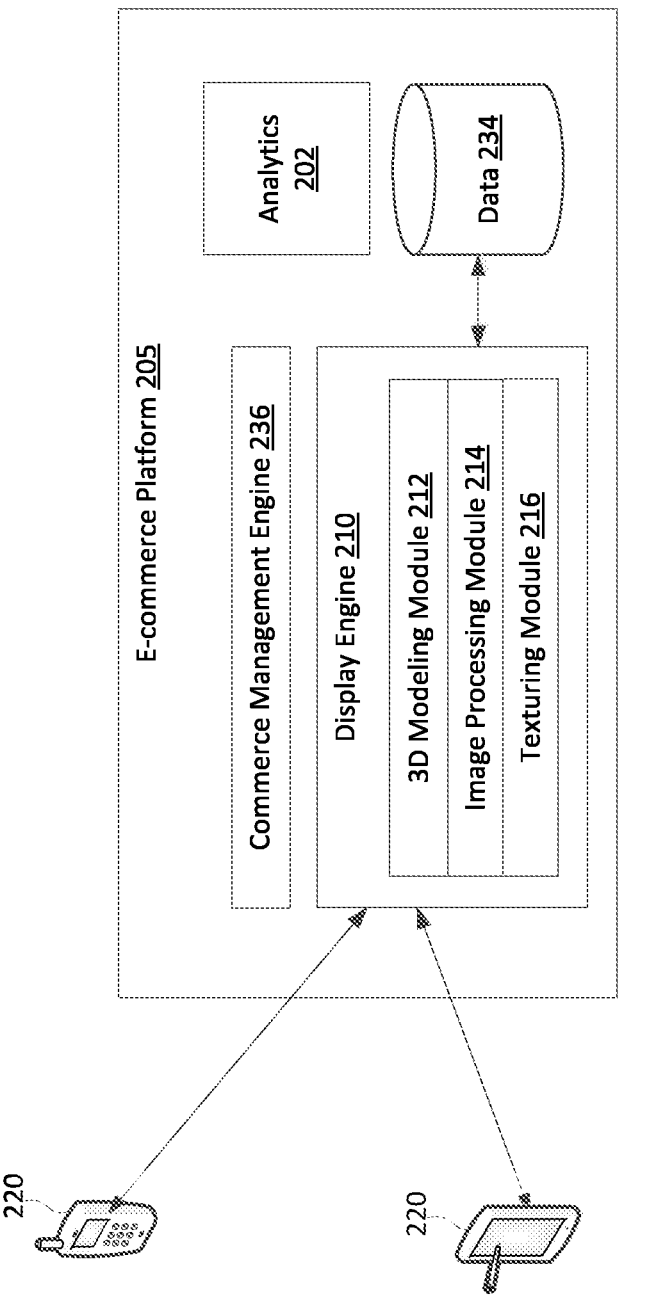
FIG. 2 is a block diagram of an e-commerce platform that is configured for implementing example embodiments of the display engine illustrated in FIG. 1.

Reference is made to FIG. 2 which illustrates an example embodiment of an e-commerce platform 205 that implements a display engine 210. The client devices 220 may be communicably connected to the e-commerce platform 205. In at least some implementations, the client devices 220 may be associated with accounts of the e-commerce platform 205. Specifically, the client devices 220 may be associated with individuals that have accounts in connection with the e-commerce platform 205. For example, one or more client devices 220 may be associated with customers (e.g., customers having e-commerce accounts) or merchants having one or more online stores in the e-commerce platform 205. The e-commerce platform 205 may store indications of associations between client devices and customers or merchants of the e-commerce platform, for example, in the data facility 134.

The e-commerce platform 205 includes a commerce management engine 236, a display engine 210, a data facility 234, and a data store 202 for analytics. The commerce management engine 236 may be configured to handle various operations in connection with e-commerce accounts that are associated with the e-commerce platform 205. For example, the commerce management engine 236 may be configured to retrieve e-commerce account information for various entities (e.g., merchants, customers, etc.) and historical account data, such as transaction events data, browsing history data, and the like, for selected e-commerce accounts.

The functionality described herein may be used in commerce to provide improved customer or buyer experiences. The e-commerce platform 205 may implement the functionality for any of a variety of different applications, examples of which are described herein. Although the display engine 210 of FIG. 2 is illustrated as a distinct component of the e-commerce platform 205, this is only an example. An engine could also or instead be provided by another component residing within or external to the e-commerce platform 205. In some implementations, one or more applications that are associated with the e-commerce platform 205 may provide an engine that implements the functionality described herein to make it available to customers and/or to merchants.

Furthermore, in some implementations, the commerce management engine 236 may provide that engine. However, the location of the display engine 210 may be implementation specific. In some implementations, the display engine 210 may be provided at least in part by an e-commerce platform, either as a core function of the e-commerce platform or as an application or service supported by or communicating with the e-commerce platform. Alternatively, the display engine 210 may be implemented as a stand-alone service to clients such as a client device or a merchant device. In addition, at least a portion of such an engine could be implemented in the merchant system and/or in the client device. For example, a client device could store and run an engine locally as a software application.

The display engine 210 is configured to implement at least some of the functionality described herein. Although the embodiments described below may be implemented in association with an e-commerce platform, such as (but not limited to) the e-commerce platform 205, the embodiments described below are not limited to e-commerce platforms.

The data facility 234 may store data collected by the e-commerce platform 205 based on the interaction of merchants and customers with the e-commerce platform 205. For example, merchants provide data through their online sales activity. Examples of merchant data for a merchant include, without limitation, merchant identifying information, product data for products offered for sale, online store settings, geographical regions of sales activity, historical sales data, and inventory locations. Customer data, or data which is based on the interaction of customers and prospective purchasers with the e-commerce platform 205, may also be collected and stored in the data facility 234. Such customer data is obtained on the basis of inputs received via client devices associated with the customers and/or prospective purchasers.

By way of example, historical transaction events data including details of purchase transaction events by customers on the e-commerce platform 205 may be recorded and such transaction events data may be considered customer data. Such transaction events data may indicate product identifiers, date/time of purchase, final sale price, purchaser information (including geographical region of customer), and payment method details, among others. Other data vis-à-vis the use of e-commerce platform 205 by merchants and customers (or prospective purchasers) may be collected and stored in the data facility 234.

The data facility 234 may include customer preference data for customers of the e-commerce platform 205. For example, the data facility 234 may store account information, order history, browsing history, and the like, for each customer having an account associated with the e-commerce platform 205. The data facility 234 may additionally store, for a plurality of e-commerce accounts, wish list data and cart content data for one or more virtual shopping carts.

Figure 3:
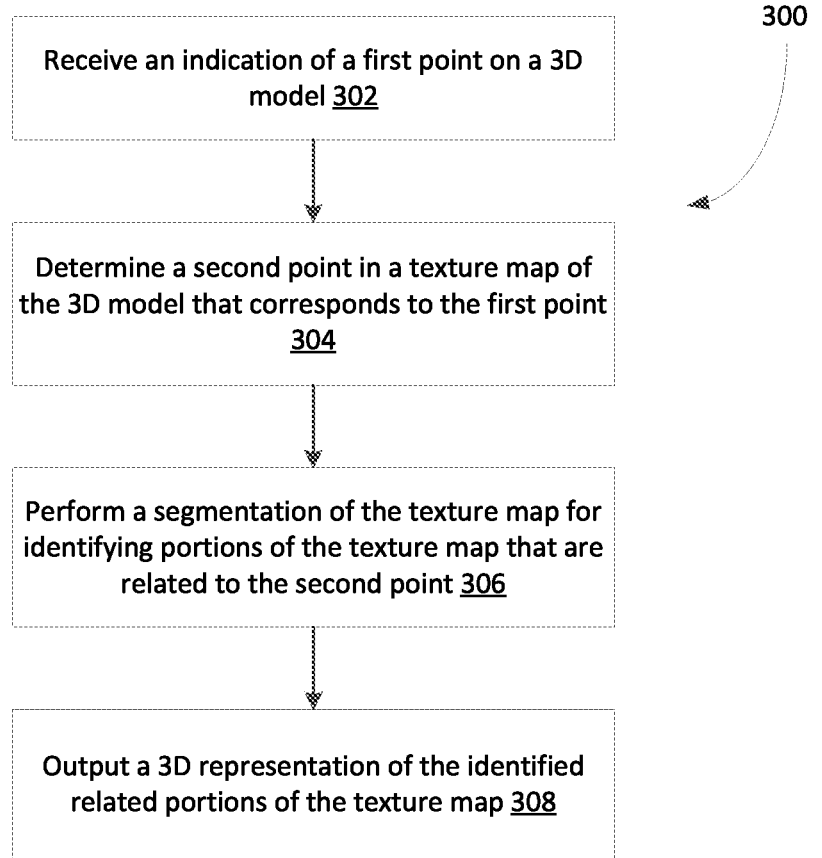
FIG. 3 shows, in flowchart form, an example method for customizing texture data of a 3D model of an object.

Reference is now made to FIG. 3, which shows, in flowchart form, an example method 300 for customizing texture data of a 3D model of an object. The method 300 may be performed by a computing system that supports visualization of 3D models, such as the display engine 210 of FIG. 1. As detailed above, a display engine may be a service that is provided within or external to an e-commerce platform. A display engine may implement the operations of method 300 when processing requests for modeling physical, real-world objects.

The display engine obtains information describing the physical details of a real-world object. Specifically, the display engine obtains three-dimensional model data for a first object. The 3D model comprises data describing the shape and appearance of the first object. Upon obtaining the model data, the display engine renders the 3D model in a user interface. For example, the 3D model may be rendered in a graphical user interface associated with modeling (or editing) software.

The 3D model may comprise a textured surface mesh and/or point clouds. The 3D model may be created based on, for example, 3D scan data associated with a 3D scan of the first object. The 3D scan data may include at least one of camera data or scanner data (e.g., long-range laser scanner, LiDAR scanner, etc.). The camera data may include image or video data obtained using one or more camera sensors. For example, the camera data may be obtained via a camera associated with a user's computing device, such as a smartphone or tablet computer. The 3D scan data may be obtained during a manual 3D scan performed by a user. The manual scan may be performed so as to capture all or a significant portion of the physical information associated with the first object.

The 3D scan data provides geometric and/or texture information associated with the first object. The geometric data may include, for example, outline contour information. The display engine constructs a geometric model of the first object using the 3D scan data. In at least some implementations, the 3D scan data includes surface texture data for the first object. Surface texture indicates the nature of an interpreted surface—a portion of a real-world surface—and may be described using specialized terms, such as lay, waviness, surface roughness, and color. In particular, surface texture comprises the small, local deviations of a surface from the perfectly flat ideal. For purposes of the present application, the term "surface texture" (or just "texture") is used to broadly refer to data describing characteristics and appearance of a solid object's surface(s).

The display engine may obtain the 3D model of the first object by retrieving the model data from a database storing 3D data associated with various real-world objects. Additionally, or alternatively, the 3D representation may be determined based on sensor data from user devices, such as client devices 220 of FIG. 1, that are configured to capture 3D scan data. A user may perform a manual scan of the first object using their computing device, and the captured sensor data, such as camera and/or LiDAR sensor data, associated with the scan may be transmitted to the display engine. The sensor data may be transmitted in real-time during a manual scan, or it may be stored locally and transmitted upon request from the display engine for 3D data associated with the first real-world environment.

A user may interact with a rendered 3D model of the first object, via a graphical user interface. By way of example, a user may select a specific point on the 3D model that is visible in a current rendered view within the GUI. The user may indicate, using an input device, selection of a point on a surface of the 3D model. The display engine receives an indication of the user-selected first point on the 3D model, in operation 302. In particular, the display engine may receive user input for selecting a point on a render of the 3D model. The user input may comprise a selection that is made using an input device, such as a mouse, stylus, and the like. The first point may be indicated, for example, using coordinates of the first point in 3D space.

In operation 304, the display engine determines a second point in a texture map of the 3D model that corresponds to the user-selected first point. That is, the first point on the 3D model is mapped to a point in texture space. The texture map comprises a two-dimensional image representing a projection of the 3D model's surfaces in texture space. The texture map may be a bitmap image or a procedural texture. In at least some implementations, the second point may be determined based on a mapping of 3D coordinates of the first point to texture space. In particular, a UV map that provides a connection between the surface mesh of the 3D model and the texture map may be used for determining the second point. The display engine may obtain the UV map data for the 3D model, and use the mapping to determine the coordinates of the second point in texture space.

The display engine then performs a segmentation of the texture map, in operation 306. In particular, the texture map is processed and partitioned into multiple image segments (or image regions). The segmentation enables identifying portions of the texture map that are related to the second point in some defined way. In at least some implementations, the display engine runs a segmentation algorithm on the texture map. The algorithm may be a semantic segmentation algorithm. Semantic segmentation associates a label or class with every pixel in an input image. The segmentation algorithm may take, as input, the texture map and an indication of the second point, such as the point's coordinates in texture space. The segmentation may identify all or multiple points/portions of the texture map that are of the same class (e.g., belonging to a same surface section).

In some embodiments, the display engine may implement a promptable image segmentation model. An example of such a model is the "Segment Anything Model"™ by Meta, a transformer-based deep learning model that is trained on a large dataset of images and masks. Users can provide various prompts to the model, such as points, bounding boxes, masks, or point grids, for specifying what to segment in the input image. The display engine may process the users' input prompts to extract and run the segmentation algorithm based on the prompt data.

The segmentation model may be provided with a set of defined pixel categories. The categories may be defined, for example, based on user input for specifying one or more categories to which pixels of the input image should be assigned, such as object classes, element classes, sub-element classes, texture classes, etc. The number, types, and identifiers of the categories may be customized by users for classifying the content of the input image. For example, a user of the modeling software may select a first point on the 3D model and indicate one or more categories into which the pixels/portions of the texture map are desired to be classified.

Additionally, or alternatively, the pixel categories for the segmentation model may be autogenerated. In some implementations, the pixel categories may be defined automatically based on image data, such as image description, metadata, etc. of the input image. For example, if metadata associated with the 3D model/texture map indicates that the model corresponds to a particular object (e.g., a handbag), the pixel categories may be defined to include defined object features (e.g., clasp materials, zippers, leathers, etc.) associated with said object. The pixel categories may be generated at runtime, for example, using an LLM. As another example, image analysis on a texture map of the 3D model may facilitate identifying certain common materials associated with the model. The pixel categories may be defined to include a set of identified common materials for the model.

An output of the segmentation may comprise a pixel-wise segmentation map of the input image, with each pixel of the image being assigned to a specific class/label. The segmentation output may indicate those pixels (and more generally, portions) of the texture map that are related to the second point in some defined way. For example, the segmentation output may identify portions of the texture map that have the same (or same class of) texture as the second point in texture space. When a user selects the first point on the 3D model, the display engine may automatically run the segmentation algorithm on the corresponding texture map. A segmentation output identifying portions of the texture map that are classified into the same texture class (e.g., pattern, color, material, etc.) as the second point may be generated. As another example, the segmentation output may indicate portions of the texture map that are part of the same object (or object part, sub-part, etc.) as the second point. That is, segmentation output identifying portions of the texture map that are classified into the same object class may be generated.

The display engine may graphically represent the segmentation output via a suitable user interface, such as the GUI of the modeling software. In operation 308, the display engine outputs a 3D representation of the identified related portions of the texture map. In some implementations, the output may comprise a 3D version of a segmentation mask, such as one or more object masks (and more generally, image masks). The segmentation masks may be viewed in the user interface, and the modeling software may provide users with options for performing various actions in connection with the segmentation masks. Such masks may enable, among others, points selection and texture editing for the 3D model of the first object. Where the input prompt is ambiguous, multiple valid masks may be generated by the display engine.

Figure 4:
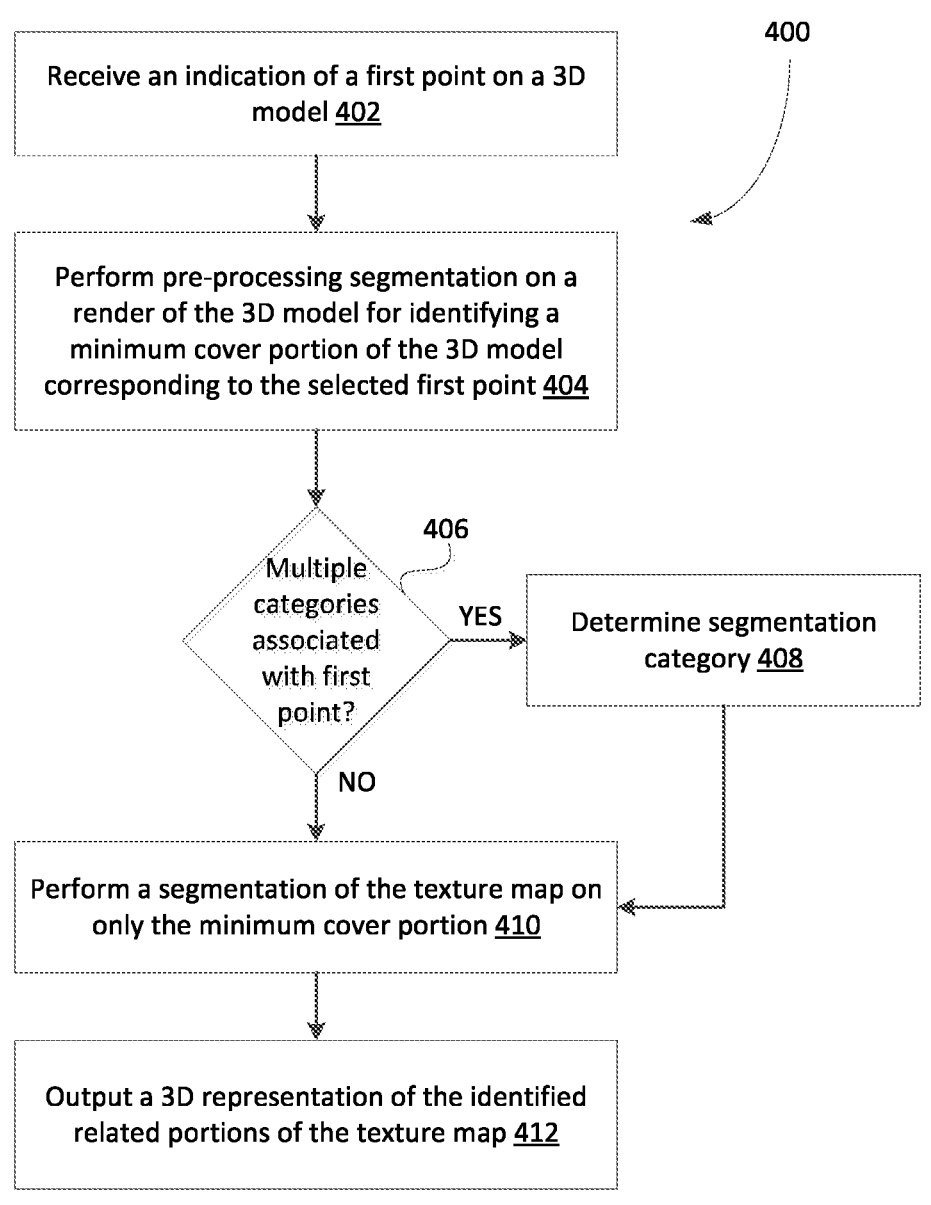
FIG. 4 shows, in flowchart form, another example method for customizing texture data of a 3D model of an object.

Reference is now made to FIG. 4, which shows, in flowchart form, another example method 400 for customizing texture data of a 3D model of an object. The method 400 may be performed by a computing system that supports visualization of 3D models, such as the display engine 210 of FIG. 1. As detailed above, a display engine may be a service that is provided within or external to an e-commerce platform. A display engine may implement the operations of method 400 when processing requests for modeling physical, real-world objects. The operations of method 400 may, collectively or individually, be performed in addition to, or as alternatives of, one or more operations of method 300.

In operation 402, the display engine receives user input of selection of a first point on a 3D model. The 3D model may be displayed, for example, in modeling or editing software, and the user may input the selection of the first point using an input device (e.g., a mouse or stylus). The first point represents a portion of the 3D model for which the user requests to identify other similar portions. In particular, the first point may be part of a user request to select similar elements to the first point on the 3D model or to effect defined change(s) to such similar elements.

The method 300 of FIG. 3 describes using the correspondence between a 3D model and its texture map. More particularly, a selected first point on a 3D model is mapped to a second point in texture space, and segmentation (such as semantic segmentation) is run on the texture map. The segmentation takes, as input, the texture map and an indication of the second point. In some implementations, the segmentation process may be time-consuming and resource-intensive, particularly for texture maps corresponding to complex 3D geometries.

In operation 404, the display engine performs a pre-processing segmentation on a two-dimensional render of the 3D model for identifying a minimum cover portion of the 3D model corresponding to the selected first point. More particularly, an image of a 2D render of the current view of the 3D model is obtained by the display engine, and an initial (i.e., pre-processing) segmentation is performed on this 2D render image. The display engine may, for example, run a semantic segmentation algorithm, with the 2D render image and the selected first point as input.

The output of this pre-processing step may comprise an identification of points/regions of the 2D render image that are related to the first point in some defined way. The identified points/regions may correspond to portions of the 3D model that have a same class/label as the selected first point. For example, the identified points/regions may each belong to same surface sections as the first point. As another example, each of one or more of the identified points may share the same texture as the first point. More generally, the identified points may be assigned to at least one same category as the first point by the pre-processing segmentation.

A particular point on a 3D model may be associated with multiple different pixel categories. For example, a point on the model may belong to a portion/region of an object surface that is associated with a certain surface texture, material (e.g., metal, wood, etc.), color, or the like. As such, when a user selects a point on the 3D model, it may be desired to first determine what category of other points is intended by the user for bulk selection of points. In particular, the display engine may be configured to determine other points on the 3D model that are to be simultaneously selected with the first point, based on identifying points that belong to a same category as the first point. Depending on the user's desired category, different sets of points/portions of the 3D model may be selected.

In operation 406, the display engine may determine whether the selected first point is associated with multiple pixel categories or a single category. If the first point is associated with multiple categories (e.g., surface texture, material, etc.), the display engine first determines which of the categories is desired, by the user, for use in segmenting the texture map (operation 408). In some implementations, the desired category may be determined based on user input. For example, if the first point is associated with defined surface texture and material, the user may be prompted, by the display engine, to select one of "surface texture" or "material" as the desired category. The prompt to the user may include a list of the categories associated with the first point and an option to select one of the listed categories. Depending on the user's selection, different sets of points, i.e., a first set of points having same surface texture as the first point or a second set of points having same material as the first point, of the 3D model may be simultaneously selected with the first point.

In operation 410, the display engine processes a subsequent segmentation of the texture map on only the minimum cover portion. Specifically, the segmentation algorithm is run a second time on a texture map corresponding to the 3D model in the texture space. Since the pre-processing segmentation was run on an image of a rendered view (i.e., visible portions) of the 3D model, the subsequent segmentation step can be limited to portions of the texture map that were not included in the rendered view. The display engine may thus determine these non-included portions of the texture map, and the subsequent segmentation can be run using the identified points/regions of the pre-processing segmentation as inputs to the segmentation algorithm. In this way, the display engine may identify points/regions of the object surfaces that are of the same class/label, e.g., belonging to same surface sections, as the selected first point. This subsequent segmentation process involves iterating over the identified points/regions from the pre-processing segmentation, ending once the full minimum cover portion is accounted for in the texture space.

In operation 412, the display engine outputs a 3D representation of the identified related portions of the texture map. In some implementations, the output may comprise a 3D version of a segmentation mask, such as one or more object masks (and more generally, image masks). The segmentation masks may be viewed in the user interface, and the modeling software may provide users with options for performing various actions in connection with the segmentation masks. Such masks may enable, among others, points selection and texture editing for the 3D model of the first object. Where the input prompt is ambiguous, multiple valid masks may be generated by the display engine.

FIGS. 6A to 6D illustrate an example user interaction for modifying texture data of a 3D model. The figures show a 3D view 600 of a 3D model of an object and a texture map 610 associated with the 3D model. The texture map 610 is a two-dimensional image, and is configured to graphically represent texture portions corresponding to user-selected point(s) on the 3D model. For example, in FIG. 6A, a user's selection of point 605 in the 3D view 600 causes a texture portion 615 in the texture map 610 to be highlighted. The selection in the 3D view may automatically cause the texture portion 615 to be selected and/or highlighted, and the texture portion 615 may be updated as different points on the 3D model are selected by the user. The texture portion 615 represents a portion of the texture map 610 that is related to a second point, also on the texture map, corresponding to the user-selected first point on the 3D model.

Figure 6A:
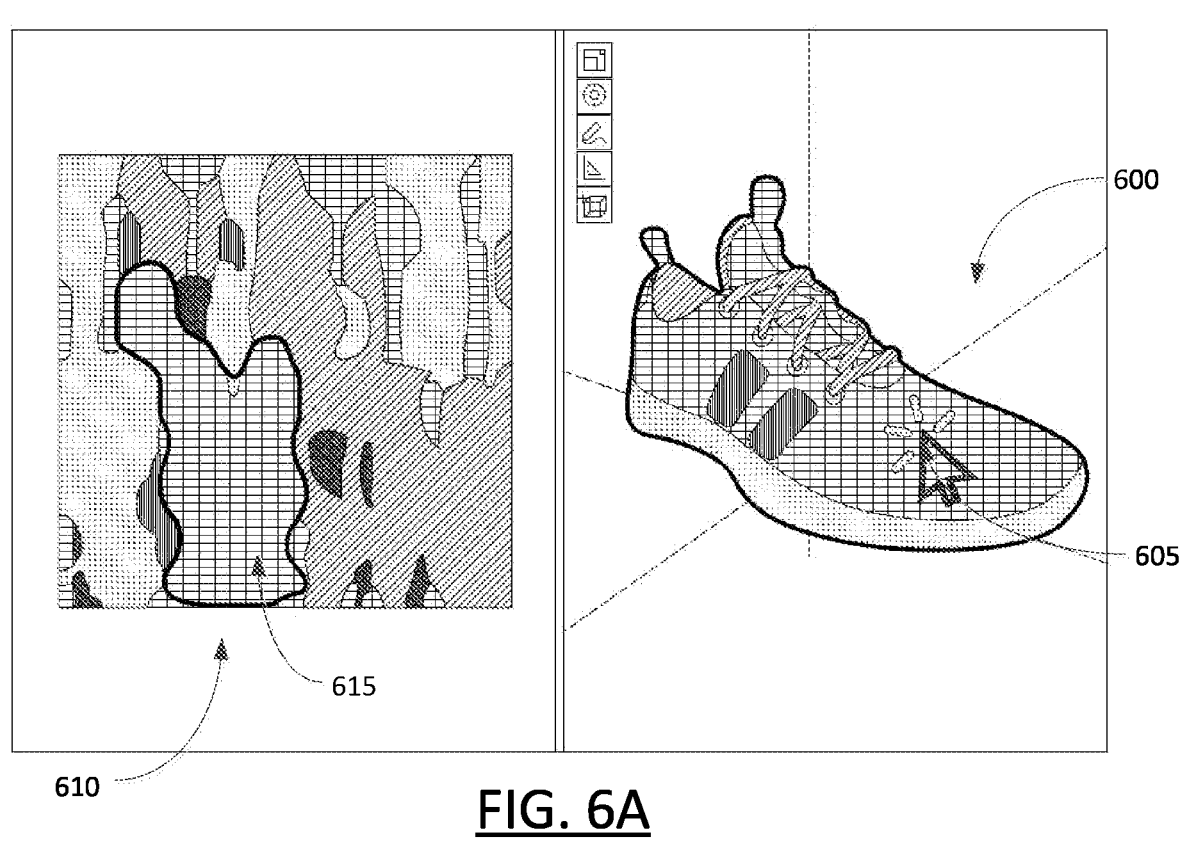
FIG. 6A to 6D illustrate an example user interaction for modifying texture data of a 3D model.
Figure 6B:
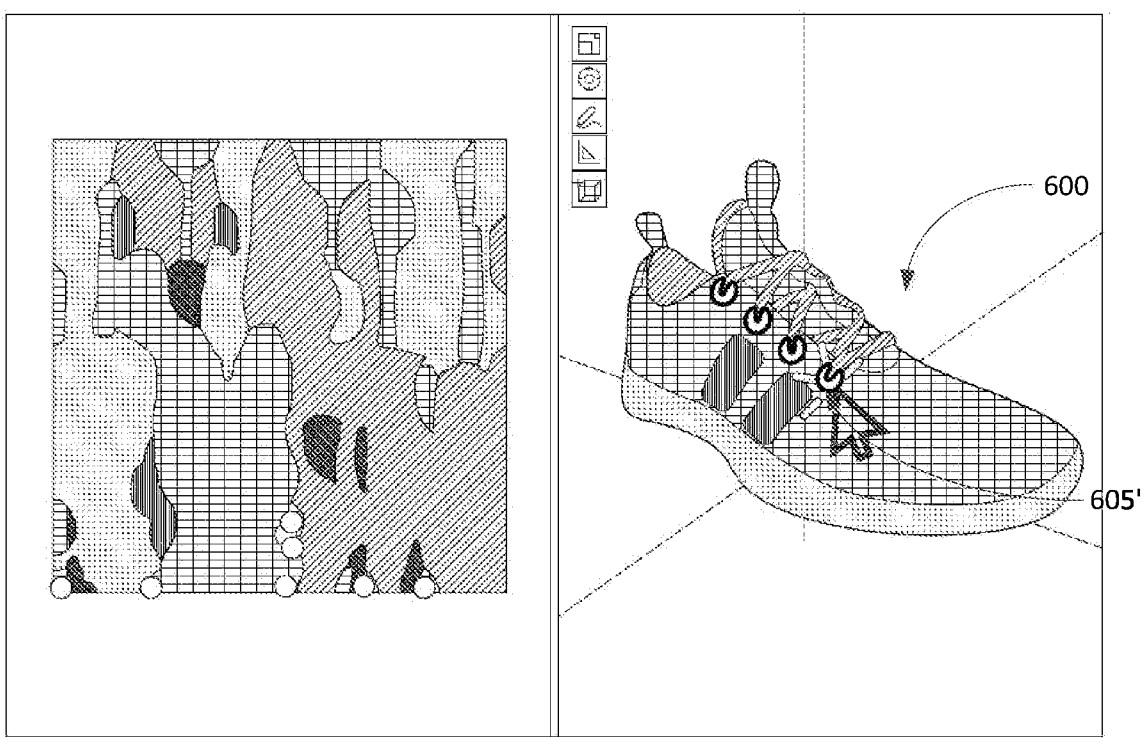

FIG. 6B shows a different point 615' on the 3D model being selected. The point 615' may be associated with a single pixel category or multiple different categories (e.g., surface texture, material, etc.). For example, the point 615' may be associated with "metal" category. The pixel categories may be determined automatically (for example, based on automated image analysis, metadata, image description, and the like) or manually input by the user. If the point 615' is associated with only the "metal" category, the display engine may be configured to use this category for segmenting the texture map. For example, an input to the segmentation algorithm may include a second point 615' corresponding to the user-selected point 605' and instructions for segmenting the texture map to identify portions associated with the "metal" category.

Figures 6C, 6D:
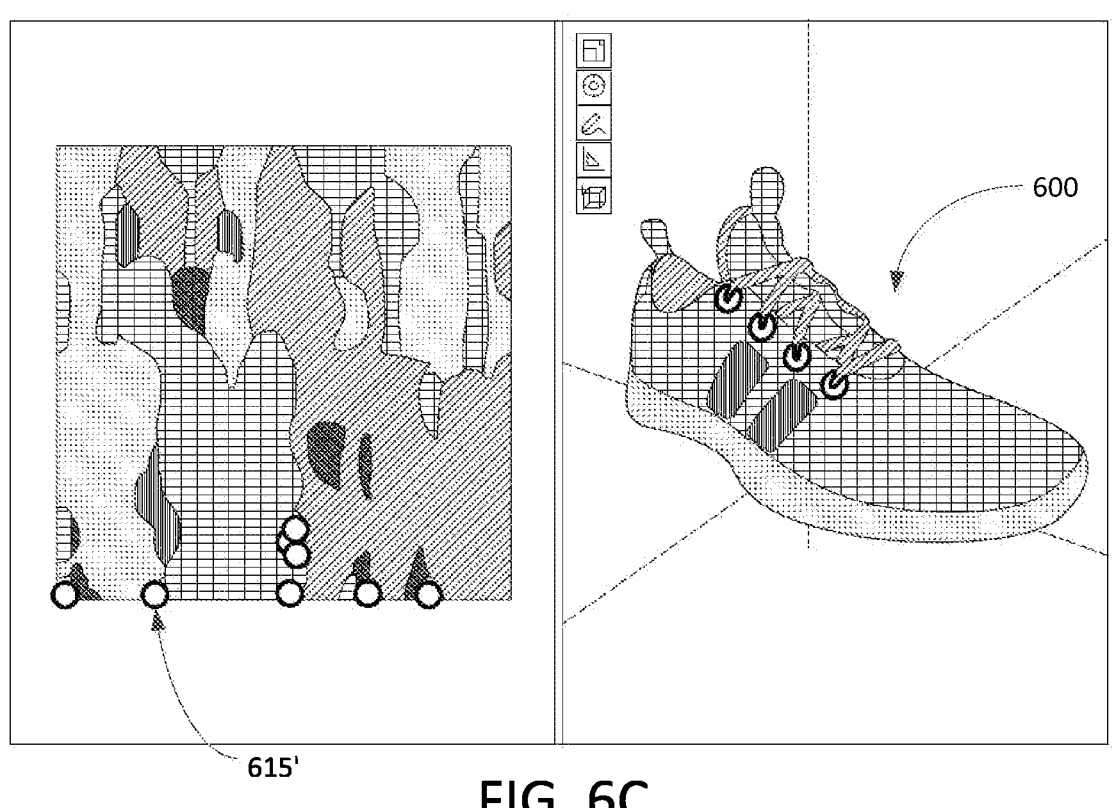

As shown in FIG. 6C, the image segmentation may allow for all or a plurality of other points on the texture map that belong to the same category (i.e., metal) as the first point to be automatically selected and/or highlighted in the texture map associated with the 3D model. The selection of points can then be used for bulk update of texture on the 3D model. For example, the points 615" shown in FIG. 6D correspond to the points 615' after a change of material (e.g., from metal to yellow plastic) that is applied in bulk. In particular, the change is applied to the points 615" without the user having to manually select each of said points individually in the 3D view 600 of the 3D model.

Figure 5:
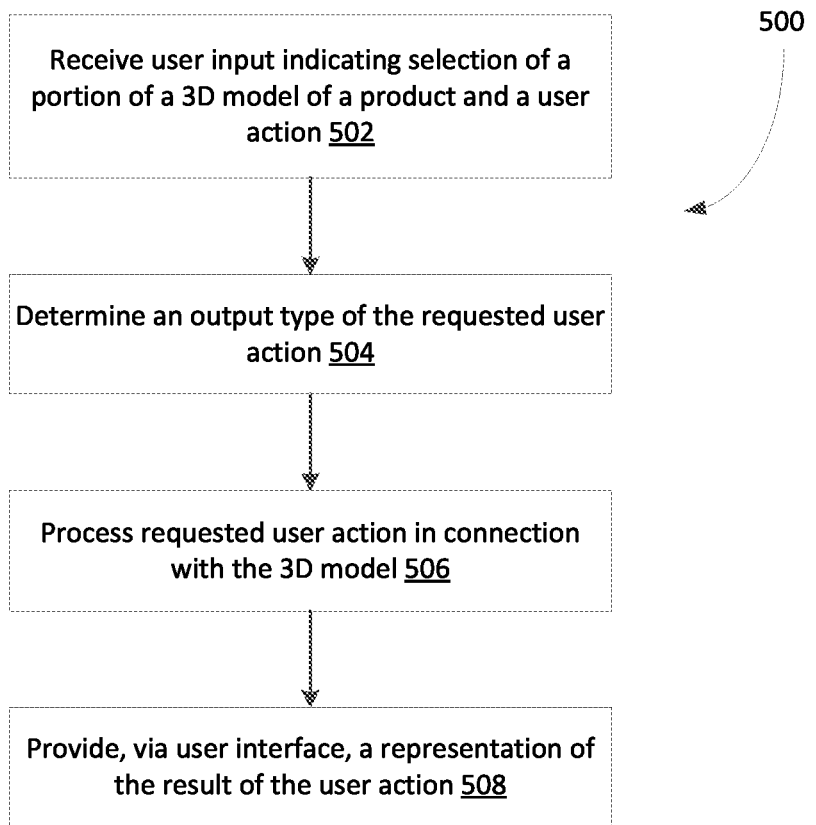
FIG. 5 shows, in flowchart form, an example method for processing user interactions with a 3D model of a product.

Reference is now made to FIG. 5, which shows, in flowchart form, an example method 500 for processing user interactions with a 3D model of a product. The method 500 may be performed by a computing system that supports visualization of 3D models, such as the display engine 210 of FIG. 1. As detailed above, a display engine may be a service that is provided within or external to an e-commerce platform. A display engine may implement the operations of method 500 when processing requests for modeling physical, real-world objects. The operations of method 500 may, collectively or individually, be performed in addition to, or as alternatives of, one or more of the operations of methods 300 and 400.

3D models may be generated using modeling software to represent real-world objects. For example, a user interface associated with an e-commerce platform may provide users with access to 3D models that represent products that are offered for sale on the platform. The user interface may, for example, be a webpage, mobile application, or another GUI which may be used for accessing features of the e-commerce platform. A 3D model of a product may be accessed when a user, such as a customer or merchant, requests, via the user interface, graphical information associated with a selected product.

The techniques for customizing 3D models, as disclosed herein, may enable users to modify various aspects of a 3D model of a product. In operation 502, the display engine receives user input indicating a selection of a portion of a 3D model and a specific user action to perform on the selected portion. For example, the user may select a first point (or region, etc.) on the 3D model using an input device, such as a mouse or stylus, and the selected point may be graphically represented in the GUI. A graphical indicator, such as highlights or a change in color, of the selected point may be shown.

The user action may correspond to a customer-facing or merchant-facing interaction with the product. Customers may wish to manipulate or modify the 3D model of a product in order to view possible variants of the product. For example, an online store may provide a product configurator tool that enables customers to select a specific product and to perform actions for effecting changes to properties (color, material, pattern, etc.) or other elements (e.g., design, printed matter such as logo or artwork, etc.) associated with the product. The requested changes may be applied directly on the 3D model. The product configurator tool may support visualization of 3D models of products and options for users to request their desired changes to a 3D model of a selected product.

Merchants may also benefit from the use of 3D models of products. A merchant may upload product data, including 3D model data, of their products to an online store of the e-commerce platform. The 3D model data for the merchant's products may be created and edited by the merchant, for viewing (by customers) in the online store. In this way, the merchant can use 3D models to exercise control over the visualization of their products.

In operation 504, the display engine determines an output type of the requested user action in connection with the 3D model of the product. The output type may specify a form of representing the result of performance of the requested user action. By way of example, if the user action is "selection", the output type may be a mask indicating points on the 3D model that are related to the user-selected first point. The user action for "selection" may result in automatically selecting the first point as well as a plurality of other points that are related to the first point. The related points may, for example, include points of the 3D model that belong to the same class (e.g., same object class, element class, etc.) as the selected first point.

As another example, if the user action is "change texture", the output type may be a graphical representation of a change in texture that is applied to the first point as well as portions of the 3D model that are related to (e.g., belonging to the same texture class as) the first point. The user action for "change texture" may result in changes to the visualization of the 3D model such that new texture data (e.g., different color, material, etc.) is associated with the selected point and its related portions within the 3D model.

In operation 506, the display engine processes the requested user action in connection with the 3D model. In particular, the customization of texture data in connection with the 3D model of the user-selected product may proceed in accordance with the methods 300 and 400 described above with respect to FIGS. 3 and 4, respectively. The selected first point on the rendered 3D model is mapped to a second point in texture space, and a segmentation algorithm is run on the texture map with the mapped second point included as part of the input to the algorithm. The display engine processes the output of the segmentation process, which identifies points/portions of the texture map that are related to the selected first point.

A representation of the result of performing the requested user action is provided, via a user interface, in operation 508. More particularly, the result of the requested user action on the 3D model is graphically represented in the GUI (e.g., GUI of modeling software, product configurator, etc.). For example, a segmentation mask associated with segmentation of the texture map may be lifted to 3D, by translating the mask into 3D space. The mask may then be displayed via the GUI in connection with the 3D model.

Figure 7A:
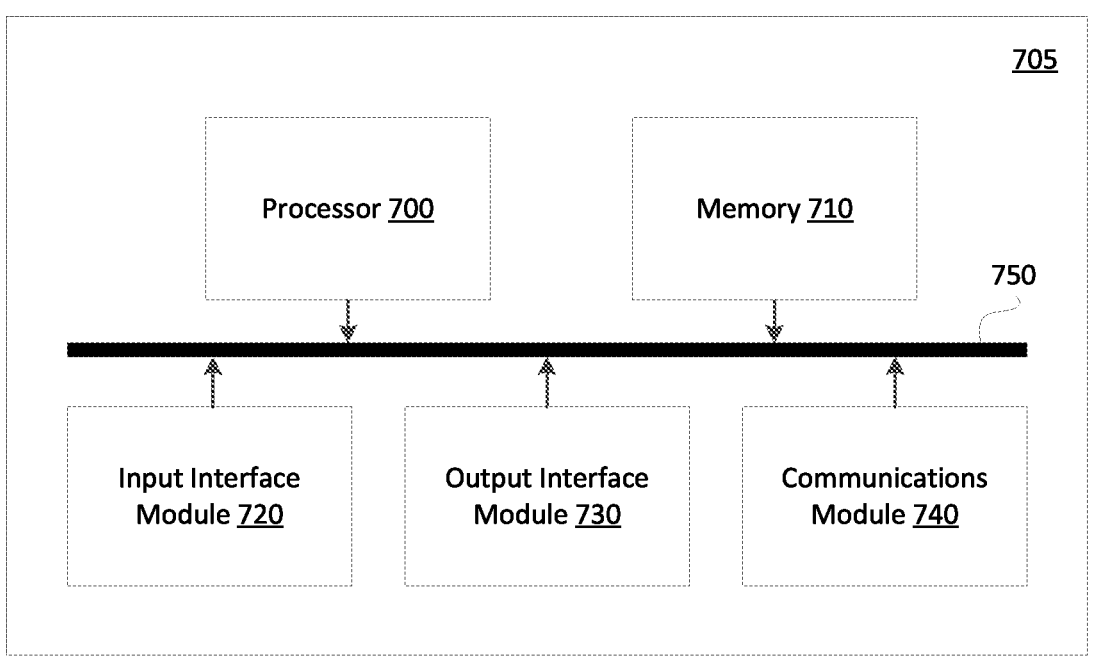
FIG. 7A is a high-level schematic diagram of an example computing device.

The above-described methods may be implemented by way of a suitably programmed computing device. FIG. 7A is a high-level operation diagram of an example computing device 705. The example computing device 705 includes a variety of modules. For example, as illustrated, the example computing device 705, may include a processor 700, a memory 710, an input interface module 720, an output interface module 730, and a communications module 740. As illustrated, the foregoing example modules of the example computing device 705 are in communication over a bus 750.

The processor 700 is a hardware processor. The processor 700 may, for example, be one or more ARM, Intel x86, PowerPC processors or the like.

The memory 710 allows data to be stored and retrieved. The memory 710 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 705.

The input interface module 720 allows the example computing device 705 to receive input signals. Input signals may, for example, correspond to input received from a user. The input interface module 720 may serve to interconnect the example computing device 705 with one or more input devices. Input signals may be received from input devices by the input interface module 720. Input devices may, for example, include one or more of a touchscreen input, keyboard, trackball or the like. In some implementations, all or a portion of the input interface module 720 may be integrated with an input device. For example, the input interface module 720 may be integrated with one of the aforementioned examples of input devices.

The output interface module 730 allows the example computing device 705 to provide output signals. Some output signals may, for example, allow provision of output to a user. The output interface module 730 may serve to interconnect the example computing device 705 with one or more output devices. Output signals may be sent to output devices by output interface module 730. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some implementations, all or a portion of the output interface module 730 may be integrated with an output device. For example, the output interface module 730 may be integrated with one of the aforementioned example output devices.

The communications module 740 allows the example computing device 705 to communicate with other electronic devices and/or various communications networks. For example, the communications module 740 may allow the example computing device 705 to send or receive communications signals. Communications signals may be sent or received according to one or more protocols or according to one or more standards. For example, the communications module 740 may allow the example computing device 705 to communicate via a cellular data network, such as for for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 740 may allow the example computing device 705 to communicate using near-field communication (NFC), via Wi-Fi™, using Bluetooth™ or via some combination of one or more networks or protocols. Contactless payments may be made using NFC. In some implementations, all or a portion of the communications module 740 may be integrated into a component of the example computing device 705. For example, the communications module may be integrated into a communications chipset.

Software comprising instructions is executed by the processor 700 from a computer-readable medium. For example, software may be loaded into random-access memory from persistent storage of memory 710. Additionally, or alternatively, instructions may be executed by the processor 700 directly from read-only memory of memory 710.

Figure 7B:
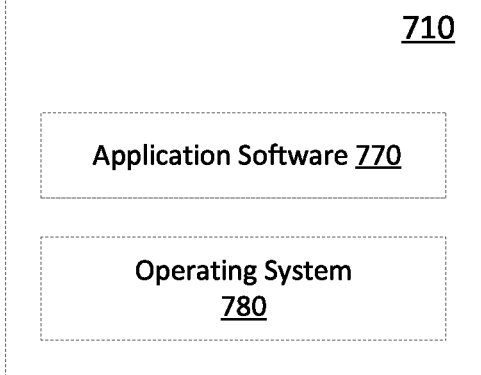
FIG. 7B shows a simplified organization of software components stored in a memory of the computing device of FIG. 7A.

FIG. 7B depicts a simplified organization of software components stored in memory 710 of the example computing device 705. As illustrated these software components include an operating system 780 and application software 770.

The operating system 780 is software. The operating system 780 allows the application software 770 to access the processor 700, the memory 710, the input interface module 720, the output interface module 730, and the communications module 740. The operating system 780 may be, for example, Apple™ OS X, Android™, Microsoft™ Windows™, a Linux distribution, or the like.

The application software 770 adapts the example computing device 705, in combination with the operating system 780, to operate as a device performing particular functions. Example E-Commerce Platform Although not required, in some implementations, the methods disclosed herein may be performed on or in association with an e-commerce platform. An example of an e-commerce platform will now be described.

Figure 8:
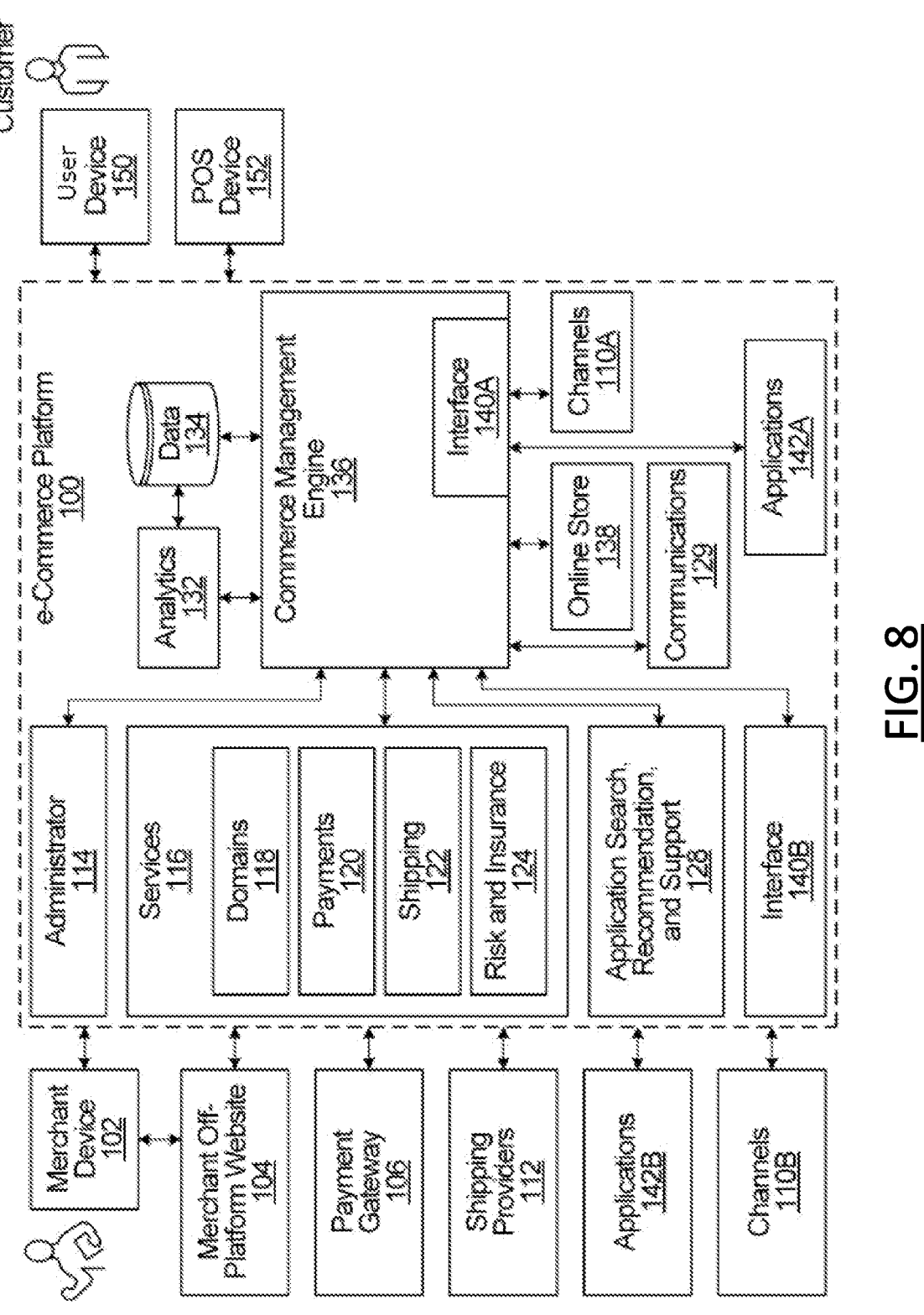
FIG. 8 is a block diagram of an e-commerce platform, in accordance with an example embodiment.

FIG. 8 illustrates an example e-commerce platform 100, according to one embodiment. The e-commerce platform 100 may be exemplary of the e-commerce platform 205 described with reference to FIG. 2. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a client device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some implementations, additionally or alternatively, be provided by one or more providers/entities.

In the example of FIG. 8, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure, the terms online store and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some implementations, a customer may interact with the platform 100 through a client device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some implementations, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, client devices 150, point of sale devices 152, etc. . . . In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through client devices 150, POS devices 152, and/or the like). In some implementations, elements of the e-commerce platform 100 may be implemented to operate and/or integrate with various other platforms and operating systems.

In some implementations, the facilities of the e-commerce platform 100 (e.g., the online store 138) may serve content to a client device 150 (using data 134) such as, for example, through a network connected to the e-commerce platform 100. For example, the online store 138 may serve or send content in response to requests for data 134 from the client device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some implementations, online store 138 may be or may include service instances that serve content to client devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some implementations, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some implementations, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 9:
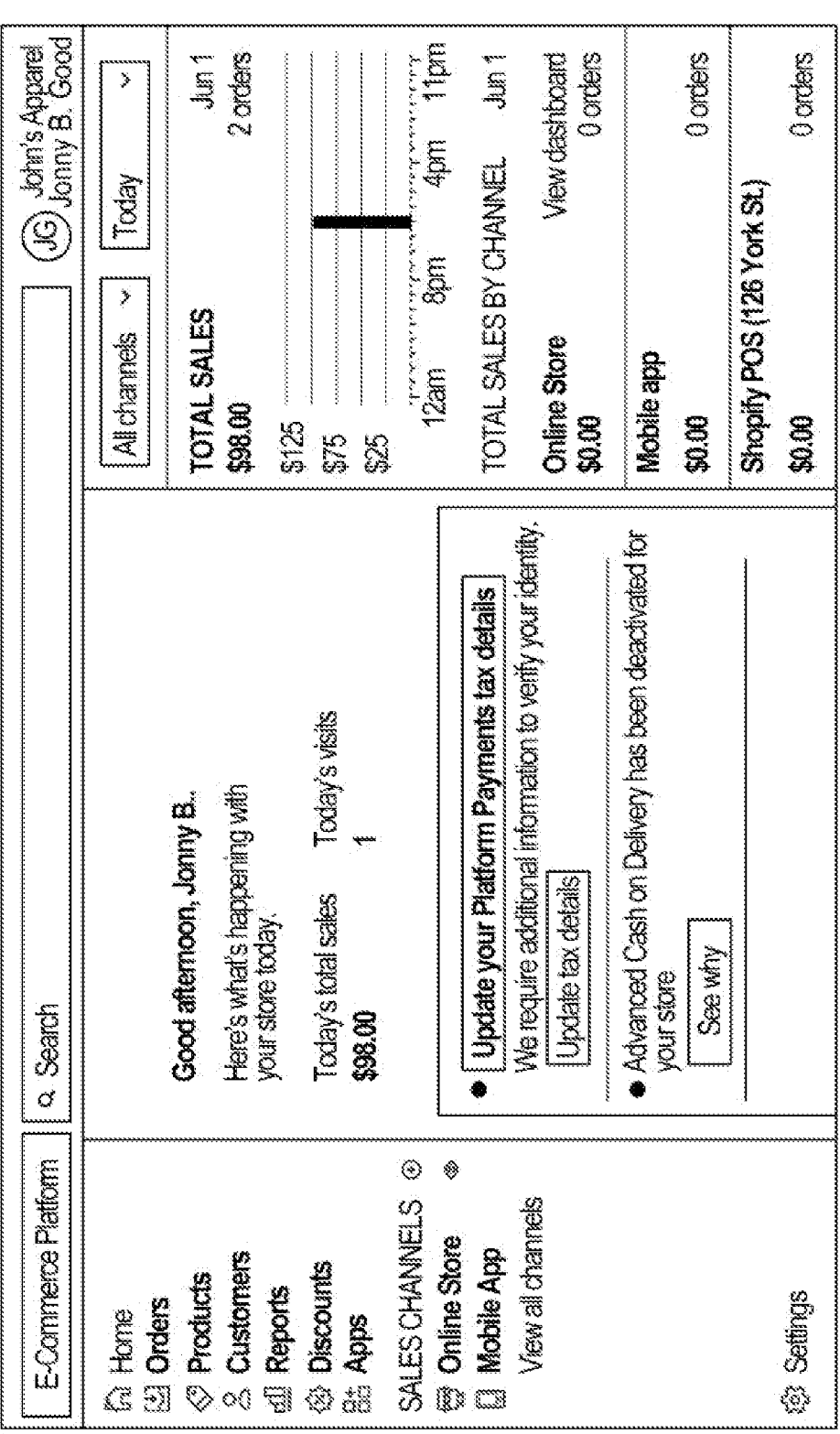
FIG. 9 is an example of a home page of an administrator, in accordance with an example embodiment.

FIG. 9 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some implementations, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some implementations, the merchant may be able to access the different sections of the administrator 114 by using a sidebar, such as the one shown on FIG. 9. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, client devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some implementations, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some implementations, the e-commerce platform 100 may store this data in a data facility 134. Referring again to FIG. 8, in some implementations the e-commerce platform 100 may include a commerce management engine 136 such as may be configured to perform various workflows for task automation or content management related to products, inventory, customers, orders, suppliers, reports, financials, risk and fraud, and the like. In some implementations, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some implementations, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some implementations, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some implementations, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some implementations, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some implementations, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some implementations, update events may be queued and processed asynchronously from a state change that triggered them, which may produce an update event notification that is not distributed in real-time or near-real time.

In some implementations, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some implementations, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-

B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some implementations, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the client device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some implementations, the commerce management engine 136 may be configured to communicate with various payment gateways and services (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some implementations, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again;

a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some implementations, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some implementations, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
   receiving input of a selection of a first point on a three-dimensional (3D) model;
   determining a second point in a texture map of the 3D model that corresponds to the first point;
   identifying portions of the texture map that belong to a same texture or object class as the second point based on performing segmentation of the texture map; and
   outputting a 3D representation of the identified portions of the texture map, wherein the 3D representation of the identified related portions of the texture map comprises a 3D version of an image mask.

2. The method of claim 1, wherein receiving selection of the first point comprises receiving, via an input device, user input for selecting a point on a render of the 3D model.

3. The method of claim 1, wherein the texture map comprises a 2D image representing a projection of the 3D model's surfaces in texture space.

4. The method of claim 1, wherein the second point in the texture map is determined based on a mapping of 3D coordinates of the first point to texture space.

5. The method of claim 1, further comprising performing a pre-processing segmentation on a render of the 3D model for identifying a minimum cover portion of the 3D model corresponding to the selected first point, wherein the segmentation of the texture map is performed only on the minimum cover portion.

6. The method of claim 1, further comprising identifying portions of the texture map that belong to a same surface section as the selected first point in the 3D model.

7. The method of claim 1, further comprising receiving a selection of one or more pixel categories, wherein the segmentation of the texture map is performed for identifying portions of the texture map that belong to a same category as the second point for at least one of the selected pixel categories.

8. A computing system, comprising:
   a processor; and
   a memory coupled to the processor, the memory storing computer-executable instructions that, when executed by the processor, are to cause the processor to:
   receive input of a selection of a first point on a three-dimensional (3D) model;
   determine a second point in a texture map of the 3D model that corresponds to the first point;
   identify portions of the texture map that belong to a same texture or object class as the second point based on performing segmentation of the texture map; and
   output a 3D representation of the identified portions of the texture map, wherein the 3D representation of the identified related portions of the texture map comprises a 3D version of an image mask.

9. The computing system of claim 8, wherein receiving selection of the first point comprises receiving, via an input device, user input for selecting a point on a render of the 3D model.

10. The computing system of claim 8, wherein the texture map comprises a 2D image representing a projection of the 3D model's surfaces in texture space.

11. The computing system of claim 8, wherein the second point in the texture map is determined based on a mapping of 3D coordinates of the first point to texture space.

12. The computing system of claim 8, wherein the instructions, when executed, are to further cause the processor to perform a pre-processing segmentation on a render of the 3D model for identifying a minimum cover portion of the 3D model corresponding to the selected first point, wherein the segmentation of the texture map is performed only on the minimum cover portion.

13. The computing system of claim 8, wherein the instructions, when executed, further configure the processor to identify portions of the texture map that belong to a same surface section as the selected first point in the 3D model.

14. The computing system of claim 8, wherein the instructions, when executed, further configure the processor to receive a selection of one or more pixel categories, wherein the segmentation of the texture map is performed for identifying portions of the texture map that belong to a same category as the second point for at least one of the selected pixel categories.

15. A non-transitory, computer-readable storage medium storing computer-executable instructions that, when executed by one or more processors, are to cause the one or more processors to:

receive input of a selection of a first point on a three-dimensional (3D) model;

determine a second point in a texture map of the 3D model that corresponds to the first point;

identify portions of the texture map that belong to a same texture or object class as the second point based on performing segmentation of the texture map; and output a 3D representation of the identified portions of the texture map, wherein the 3D representation of the identified related portions of the texture map comprises a 3D version of an image mask.

16. The storage medium of claim 15, wherein receiving selection of the first point comprises receiving, via an input device, user input for selecting a point on a render of the 3D model.

17. The storage medium of claim 15, wherein the texture map comprises a 2D image representing a projection of the 3D model's surfaces in texture space.

18. The storage medium of claim 15, wherein the second point in the texture map is determined based on a mapping of 3D coordinates of the first point to texture space.

* * * * *